(12) United States Patent
Poetsch et al.

(10) Patent No.: US 6,639,031 B1
(45) Date of Patent: Oct. 28, 2003

(54) COREACTIVE SUPPORTING MATERIALS FOR HETEROGENIZATION OF CATALYSTS, COCATALYSTS AND LIGANDS

(75) Inventors: Eike Poetsch, Mühltal (DE); Herwig Buchholz, Frankfurt am Main (DE)

(73) Assignee: Merck GmbH, Darmstadt (DE)

( * ) Notice: Subject to any disclaimer, the term of this patent is extended or adjusted under 35 U.S.C. 154(b) by 0 days.

(21) Appl. No.: 09/601,035

(22) PCT Filed: Jan. 19, 1999

(86) PCT No.: PCT/EP99/00285

§ 371 (c)(1),
(2), (4) Date: Sep. 12, 2000

(87) PCT Pub. No.: WO99/37398

PCT Pub. Date: Jul. 29, 1999

(30) Foreign Application Priority Data

Jan. 26, 1998 (DE) .......................................... 198 02 753

(51) Int. Cl.$^7$ .................................................. C08F 4/02
(52) U.S. Cl. ........................ 526/129; 526/105; 526/107; 526/907; 526/95
(58) Field of Search ................................. 526/129, 105, 526/107, 907, 95

(56) References Cited

U.S. PATENT DOCUMENTS

| | | | | |
|---|---|---|---|---|
| 4,043,941 A | * | 8/1977 | White et al. ................. | 252/430 |
| 4,455,389 A | * | 6/1984 | Lewis et al. ................. | 502/232 |
| 5,275,994 A | | 1/1994 | Weissman et al. | |

FOREIGN PATENT DOCUMENTS

| | | |
|---|---|---|
| DE | 28 01 240 | 7/1978 |
| WO | 95 26818 | 10/1995 |
| WO | 95 29755 | 11/1995 |

* cited by examiner

*Primary Examiner*—Ling-Siu Choi
(74) *Attorney, Agent, or Firm*—Millen, White, Zelano & Branigan, P.C.

(57) ABSTRACT

The invention relates to a process for preparing a support material having an increased number of reactive groups and to a process for preparing coreactive surfaces that may have catalytic or cocatalytic properties.

13 Claims, No Drawings

COREACTIVE SUPPORTING MATERIALS FOR HETEROGENIZATION OF CATALYSTS, COCATALYSTS AND LIGANDS

The present invention relates to a process for preparing coreactive support materials and to the heterogeneous catalysts and cocatalysts prepared therewith. The novel coreactive support materials having an increased number of coreactive groups make it possible to heterogenize catalysts, cocatalysts and ligands which are required for the polymerization of ethylene, propylene, hexene or styrene. However, they also make it possible to prepare catalysts for metathesis, hydrogenation, coupling, oxidation or hydroformylation reactions.

Catalytically accelerated reactions present a problem to the chemist if the catalyst cannot be readily separated from the product produced after conclusion of the reaction. In particular, this is frequently the case for homogeneous catalysis. It is therefore advantageous to heterogenize homogeneous catalysts. The latter leads not only to a product improvement but also brings a series of process-engineering advantages. Heterogenization can be carried out in various ways, either by physisorption or by chemisorption on a suitable support. Since no bonds to the actual catalyst are formed by physisorption, this generally leads to more rapid loss of the catalyst. On the other hand, chemisorption involves ionic or coordinate bonding of the catalyst to the surface of the support material. Catalytically active groups can also be fixed via ligand bonds to both organic and inorganic supports. Such organic support materials can be, for example, polystyrene derivatives. However, disadvantages of organic support materials are their low mechanical strength, their swellability and poor heat transfer-disadvantages from which inorganic support materials generally do not suffer.

The most important principle in the preparation of catalysts bound chemisorptively to inorganic support materials is reaction of a support oxide having hydroxyl groups on the surface. The latter can be, for example, $SiO_2$, $Al_2O_3$ or MgO. The surface hydroxyl groups are, for example, reacted with metal alkyls, halides or alkoxides or functionalized alkoxysilanes which are provided with a ligand group. Such reactions are known from the literature (e.g. from: J. Hagen in "Technische Katalyse", VCH Weinheim, 1996, pp. 225–240; or: M. Z. Cai et al., Synthetic Comm., 27, 361 (1997)). However, chemisorption, which is associated with the formation of an additional bond, sometimes alters the originally advantageous properties of the homogeneous catalyst in an unfavourable way due to the change in the stereo-selective situation associated with the bond formation.

Depending on chemical structure, inorganic support materials have a variable number of reactive OH groups on the surface and these can form a bond to catalytically active organic or organometallic groups. This number is from about 4.4 to 8.5 per $nm^2$ for a fully hydroxylated silica gel (H. P. Boehm, Angew. Chem. 78, 617 (1966)). These values were confirmed by J. Kratochvila et al., Journal of Non Crystalline Solids 143, 14–20 (1992). At a bond length of about 1.60 Å for the Si—O bond and an angle of 150° for the Si—O—Si angle, there are about 13 Si atoms per $nm^2$ or per 100 $Å^2$ on the silica gel surface. This means that a maximum of 13 Si—OH groups occur in the surface monolayer with additional three-fold bonding of the Si via the oxidic oxygen bridges. However, only four Si—OH groups are generally to be expected in silica gel dried at room temperature (cf. Boehm and Kratochvila).

To achieve as high as possible a number of active Si—OH bonds per unit weight on a silicate support material, the surfaces of the support material can be increased in the form of pores, clefts and/or by means of very small particle diameters. Increasing the number of Si—OH groups by saturation with water or water vapour does not lead to a satisfactory solution because the additional water adsorbed on the surface leads to hydrolysis of most coreactive ligands or catalysts which are to be chemisorbed on the surface. On the other hand, severe drying leads to a decrease in the number of Si—OH groups to less than 2 per $nm^2$.

However, it is not only the amount of adsorbed water on the surface of such silicate materials which influences the quality of the supported catalyst materials prepared therewith. Si—OH groups on the surface of a particle can have a significantly different stearic environment than those which are located in clefts and pores of the particle. This can lead to catalytic centres of differing activity and to selectivity losses. In the case of a normal particle surface, as is mostly present in the case of particles of spherical microgels, such differences may be expected to occur to a significantly lesser extent.

The same problems naturally also play a role if $Al_2O_3$, $TiO_2$ or $ZrO_2$ are used as support materials for the coreactive heterogenization of homogeneous catalysts.

It is therefore an object of the present invention to provide an inorganic support material which has a very high number of coreactive groups on the surface and has good thermal conductivity and very low swellability. A further object of the invention is to develop an inexpensive and easily implemented process for producing a very large number of coreactive OH groups on the surface and in the pores of the support material without causing occupation of the surface by water molecules, in order to avoid undesired hydrolysis of the coreactive ligand, catalyst or other support. Another object of the invention is to prepare heterogeneous catalysts and cocatalysts having a high loading per unit area and unit weight from the support materials obtained. These catalysts should have a high product selectivity in use.

The present object is achieved by a process for preparing support materials having an increased number of reactive OH groups, which is characterized in that an oxygen-containing, inorganic material of oxidic nature is reacted in an inert aprotic solvent with a strongly basic reagent, in particular an alkali metal hydroxide or alkaline earth metal hydroxide. This reacts via a complex with the OH group of the hydroxide formed as an intermediate with breaking of the oxidic bond of the support to give an OH group and an OM group on the surface, where M is an alkali metal or alkaline earth metal atom equivalent. From the OM groups newly formed by the reaction, the OH groups are set free by acidification with an organic or inorganic acid.

The object is also achieved by the application of chemisorptively bound ligands, catalysts or cocatalysts for the purpose of generating a functional surface, by a) direct reaction of the OH or corresponding OM groups generated with suitable coreactive groups of the respective ligand, catalyst or cocatalyst or b) modification of OH or corresponding OM groups generated on the surface by chemisorptively bound coreactive groups, forming a surface comprising chemisorptively bound functional organic ligands.

Here, the variant b) can be carried out via a completely different type of reaction than the variant a).

An important process variant generates the metal hydroxide required for cleavage of the oxide in situ from the physisorbed water located on the oxide. This dries the surface at the same time. Adjustment of the water content on the surface also enables the number of newly formed OH groups to be regulated. The newly formed OH groups can be converted, for example by means of hydride, into their alkali metal or alkaline earth metal salts, from which the active OH groups can be set free again in a converse manner using organic or inorganic acids.

In the process of the present invention, the natural or chemically produced, oxygen-containing, inorganic material used can be a gel, oxide or salt of silicon, boron, aluminium, titanium or zirconium.

The silicon-containing materials can be silica gel, oxygen-containing alkylsiloxanes or naturally occurring silicates derived from silicic acids having chain, band or sheet structures.

According to the invention, the silicates may be wollastonite, enstatite, diopside, trennolite, serpentine or talc.

The oxidic silicon, aluminium, titanium or zirconium derivatives are preferably support materials in the form of particularly small particles, known as nanosize particles, having a large surface area (from 10 to 1000 nm).

In the process of the invention, the titanium-containing nanosize particles can also be $BaTiO_3$.

The invention provides a process which is characterized in that inert aprotic solvents which may be either polar (tetrahydrofuran, methyl t-butyl ether, dimethylformamide, N-methylpyrrolidone, tetramethylurea) or nonpolar (hexane, heptane, cyclohexane, methylcyclohexane, toluene, xylenes) are chosen.

If water is present on the surface, an alkali metal hydride or alkaline earth metal hydride, an alkali metal oxide or alkaline earth metal oxide or polar organometallic compounds of the alkali metals or alkaline earth metals are used in the process of the invention. If there is no water present on the surface, the oxidic bonds are cleaved by means of alkali metal oxides or alkaline earth metal oxides or alkali metal hydroxides or alkaline earth metal hydroxides and converted into the salts of active OH groups.

As basic reagent, it is possible to use a hydride selected from the group consisting of NaH, LiH, KH, $MgH_2$, $CaH_2$ and $BaH_2$, an oxide selected from the group consisting of $Na_2O$, $Li_2O$, $K_2O$, MgO, CaO and BaO, an organometallic compound selected from the group consisting of butyllithium and methyllithium, an alkoxide selected from the group consisting of sodium methoxide and potassium tert-butoxide, or an alkali metal hydroxide or alkaline earth metal hydroxide selected from the group consisting of LiOH, NaOH, KOH and $Mg(OH)_2$.

According to the invention, the acidification can be carried out using an organic or inorganic acid, in particular one selected from the group consisting of the acids $CH_3SO_3H$, $CF_3SO_3H$, $H_2SO_4$, HF, HCl, HBr, HI and $H_3PO_4$.

The invention further provides a process which is characterized in that the support material is, after the formation of the OM groups or after setting free the newly formed OH groups to form a new coreactive surface having a new reaction potential, reacted with a metal derivative, namely a metal halide, organometallic compound or metal hydride or a mixture thereof or with a mixed functional derivative thereof in a manner analogous to the equations 5a–5d and equations 8a, 8b shown below.

For this purpose, use is made of a hydride or halogen compound or organometallic compound of a metal M' from group 3A, 3B, 4B, 5B or 6B of the Periodic Table of the Elements or a corresponding mixed functional derivative whose organic radical "Org" can be A, OA, ACOO, NHA, $NA_2$, SA, A—$NA_2$, A—NHA, AOH, AOA, $(AO)_yAr$, $APA_2$, $APAr_2$, cycloalkyl, saturated or unsaturated having up to 6 carbon atoms, heterocyclic or aromatic radical Ar, where A is a straight-chain, branched, saturated or unsaturated alkyl radical having from 1 to 8 carbon atoms, and Ar is substituted or unsubstituted phenyl, naphthyl, pyridyl, pyrimidyl, thienyl, furanyl, where substituents may be A, OA, CO—AOH, COOH, COOA, Cl or F.

Suitable metal halides or hydrides are compounds in which one or more of the organic radicals can be replaced by the halogens F, Cl, Br or I and/or by hydrogen.

The invention therefore also provides a coreactive support material which is prepared by the process of the invention and has a new coreactive surface having a reaction potential different from that of the original surface.

Such a coreactive support material may be an oxidic material whose surface structures can be described by organometallic compounds of the formulae (IV) or (IVa), (IVb) and (IVc)

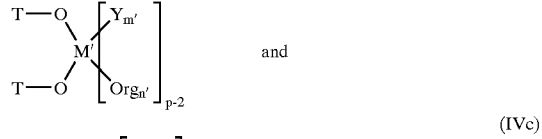

where

T is an oxidically bound element selected from the group consisting of Si, B, Al, Ti and Zr located in the core of the support material, M' is an element selected from the group consisting of the elements of groups 3A, 3B, 4B, 5B and 6B of the Periodic Table of the Elements, Z is Y, Org, Y is H, Hal, Hal is F, Cl, Br, I, and m' is from 0 to (p-x-n') and n' is from 0 to (p-x-m'), where p is the maximum possible valency of M' and x=1, 2 or 3; and Org is A, OA, ACOO, $NA_2$, SA, $ANA_2$, ANHA, AOH, AOA, $(AO)_yAr$, $APA_2$, $APAr_2$, saturated or unsaturated cycloalkyl having up to 6 carbon atoms, heterocyclic or aromatic radical Ar, identical or different, where y is 0, 1, 2, 3, 4, A is a straight-chain, branched, saturated or un-saturated alkyl radical having from 1 to 8 carbon atoms and Ar is substituted or unsubstituted phenyl, naphthyl, pyridyl, pyrimidinyl, thienyl, furanyl, where the substituents may be A, OA, COOH, COOA, Cl, F.

The compounds of the structure IVa, IVb, IVc, which may already have catalytic or cocatalytic properties, can be transformed into analogous derivatives IV, or IVd, IVe and Ivf

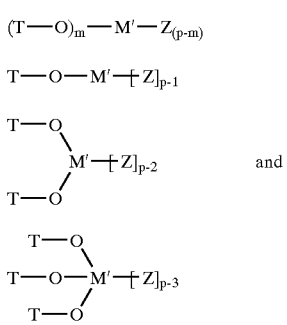

where
z is Y, Org and
T and M' are as defined above, by reaction with anionic nucleophiles, hydrogen-substituted nucleophiles or α-olefinically or α-acetylenically substituted organic compounds.

The present invention therefore also provides a process for preparing coreactive surfaces, which may have catalytic or cocatalytic properties, of the formulae IVa to IVc,

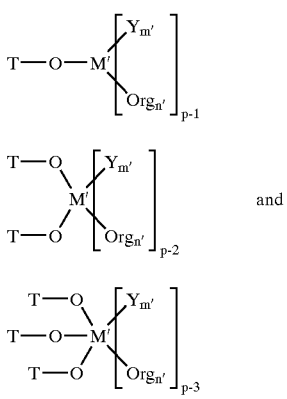

or the formulae IVd to Ivf,

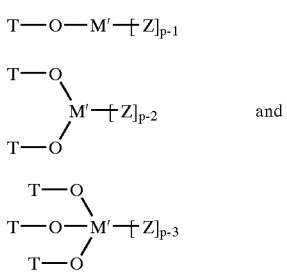

by reaction of O—M groups located or generated on the oxidic support T with metal derivatives selected from the group consisting of metal hydrides, organometallic compounds and metal halides including their mixed functional derivatives of the formula M' $(Z)_p$, with the proviso that the metal derivatives contain at least one leaving group Y=halogen or Org=alkoxy, acyloxy or organic sulphonate.

In a particular embodiment, the process of the invention is employed for preparing coreactive surfaces, which may have catalytic or cocatalytic properties, of the formulae IVa to IVc or IVd to IVf, $(T-O)_m M'-Z_{(p-m)}$ IV by reaction of support materials having freed OH groups with metal derivatives selected from the group consisting of metal hydrides, organometallic compounds, metal halides and their mixed functional derivatives of the formula

which have at least one hydride group (Y=H) or one organic group (Org).

In particular, the above-described replacement reaction with anionic nucleophiles can be carried out according to the following reaction scheme:

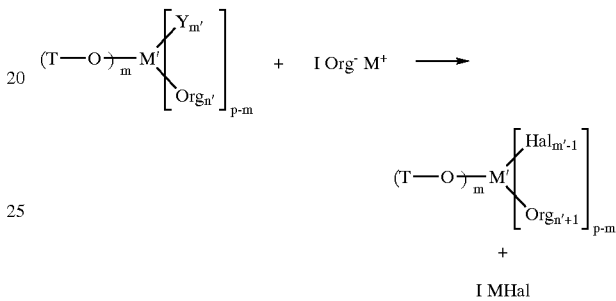

where $1 \leq m'$.

Instead of Hal, it is also possible for A or Ar groups bound via O or N to be replaced by anionic nucleophiles.

In this way, the group of supported functional systems is expanded (equations 5e to 5g), and other catalyst systems or ligand systems which may have similar or even completely different properties, depending on the type of nucleophile or olefin used, can be obtained.

Hydrogen-substituted nucleophiles of the formula

can be ones in which
Nu is A, OA, $ACO_2$, NHA, $NA_2$, SA, $ONA_2$, ONHA, O—A—OH, O—A—O—A, $(O)m-Ar$, $(HN)_m-Ar$, $(NA)_m-Ar$ (m=1,2), NH—A—OA, NH—A—NHA, NH—A—$NA_2$, NH—A—$NH_2$, A—N—A—$NA_2$, HN—A—$NA_2$, O—A—$P(R)_2$, RN—A—$P(R)_2$, S—A—$P(R)_2$, $R_2P$—$(CH_2)_j$—$[C(O)H]_k$—C(O)H—$(CH_2)_j$—P $(R)_2$, $R_2N$—$(CH_2)_j$—$[C(O)H]_k$—C(O)H—$(CH_2)_j$—$N(R)_2$, OH,
where
R is A, O—A, Aryl, OAryl, H,
j is 1, 2 or 3 and
k is 0 or 1,
where A and Aryl are as defined above.

The replacement by hydrogen-containing nucleophiles can occur according to the following reaction scheme:

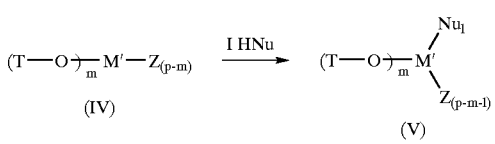

where $1 \leq (p-m)$.

IVd $\xrightarrow{\text{l HNu}}$ 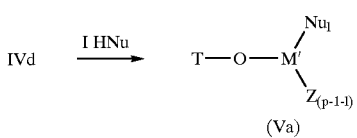

(5e)

(Va)

where l=1–3

IVe $\xrightarrow{\text{l HNu}}$ 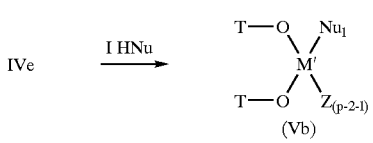

(5f)

(Vb)

where l=1–2 and

IVf $\xrightarrow{\text{l HNu}}$ 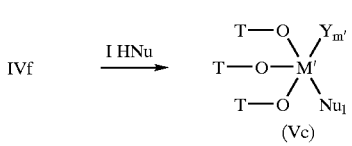

(5g)

(Vc)

where l=1.

Correspondingly, a reaction with α-olefinic or α-acetylenic organic compounds can be carried out:

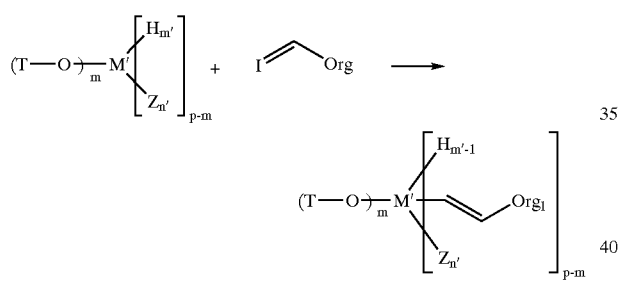

where $1 \leq m'$.

This reaction is also the first step in some polymerizations.

To carry out the transformations, different M' having different substituents can be applied to one and the same support and can be reacted separately or together.

The invention further provides for the use of a coreactive support material prepared by the process of the invention for supporting catalysts or its direct use for the polymerization of ethylene, propylene, hexene or styrene, or for use or preparation of catalysts for metathesis, hydrogenation, coupling, oxidation or hydroformylation reactions.

It has surprisingly been found that the number of active OH groups on the surface of oxygen-containing, inorganic support materials can be greatly increased in a simple manner by treatment with sodium hydride. This objective can be achieved by admixing a suitable water-containing support material in an inert, aprotic solvent, e.g. tetrahydrofuran, with alkali metal hydride or alkaline earth metal hydride, e.g. NaH, and allowing it to react.

Reaction with the water adhering to the support material liberates hydrogen gas and forms OH and OM groups on the support material, where M corresponds to an alkali metal atom or alkaline earth metal atom. In generalized terms, this formation of reactive groups on, for example, silica gel can be described by the following reaction equations:

$$a\, H_2O + M(H)_a \longrightarrow M(OH)_a + a\, H_2 \quad (1)$$

a corresponds to the valency of the metal atom.

To carry out this process, the hydride is taken up in a dried inert aprotic polar solvent and the oxygen-containing, inorganic support material, which should have a large surface area, is suspended in this mixture. The reaction proceeds at temperatures as low as about 10° C., but can also be carried out at a slighty elevated temperature of about 50° C. However, the reaction is preferably carried out at room temperature.

Oxygen-containing, inorganic support materials suitable for modification have particle diameters of from 10 to 10,000 nm; preference is given to using materials having particle diameters of from 100 to 5000 nm. Particularly good results are achieved using support materials which have a very uniform surface area of from 1 to 600 m²/g of support material.

The Si—OH groups formed can react with additional hydride to form Si—OM groups:

(3)

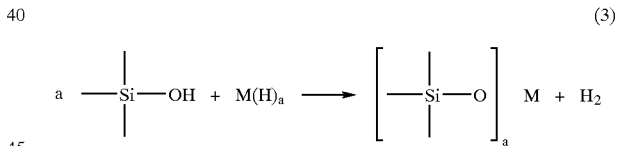

The Si—OM groups formed can be converted into active Si—OH groups by acidification.

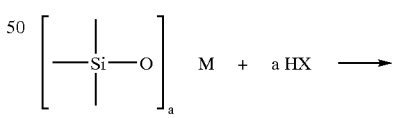

The acidification can be carried out using organic or inorganic acids. Particularly suitable acids are those of the group $CH_3SO_3H$, $CF_3SO_3H$, $H_2SO_4$, HF, HCl, HBr, HI and $H_3PO_4$.

The Si—OM groups formed in accordance with the equations (2) and (3) can react as such with the halides of elements of groups 3A, 3B, 4B, 5B and 6B of the Periodic Table of the Elements M'—(Hal)$_p$, with organohalogen compounds of the corresponding elements M'(Org Hal)$_p$ or with organohydrochlorides M'(Org H Hal)$_p$, e.g.:

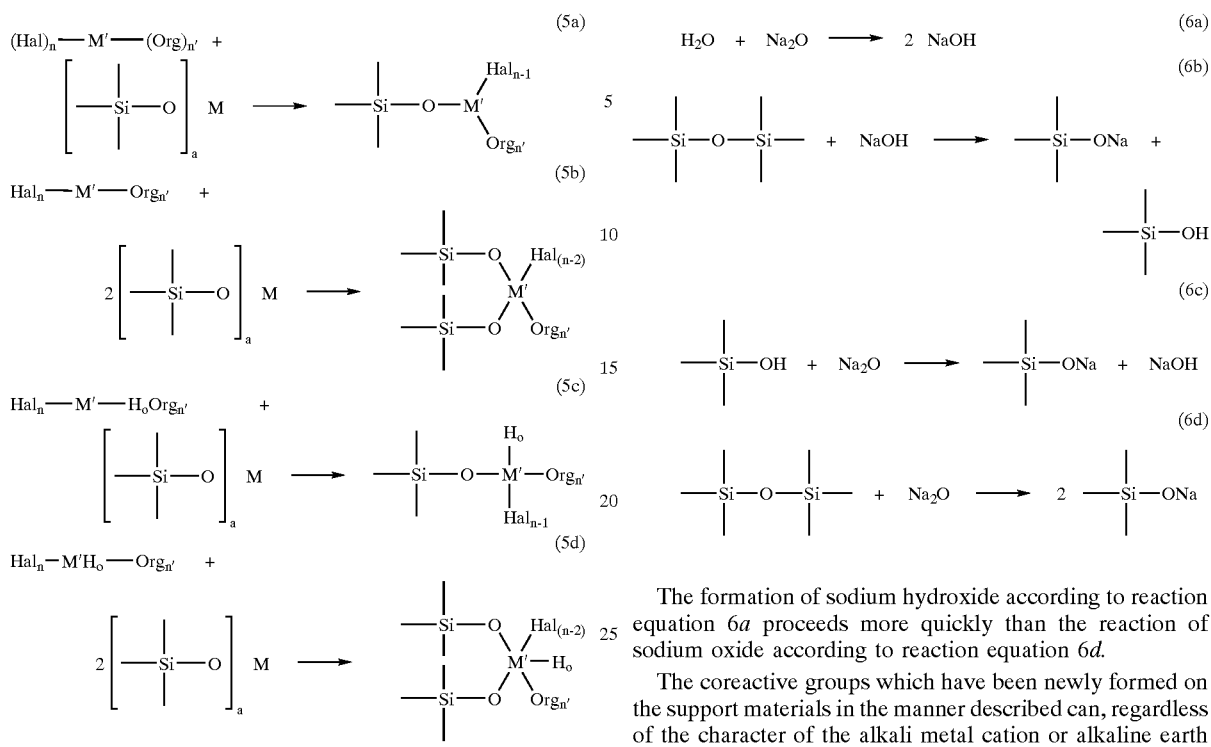

(5a), (5b), (5c), (5d)

The valency of M' corresponds to p=n+n'+o, n=1 to p; n'=0 to p−1; o=0 to p−n−n'.

The reactions represented by the equations 1–3 can be carried out using hydrides of the alkali metals, selected from the group consisting of NaH, LiH, KH and CsH, and using hydrides of the alkaline earth metals, selected from the group consisting of $MgH_2$, $CaH_2$ and $BaH_2$, so that M in the coreactive groups can be Na, Li, K, Cs, Mg, Ca or Ba:

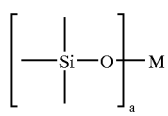

(I)

In place of the globular silica gels or alkylsiloxanes mentioned by way of example, which can be prepared from alkoxysilanes by sol-gel processes, it is also possible for aspherical silica gels and other known, naturally occurring silicates derived from silicic acids having chain, band and sheet structures to be reacted in a manner analogous to the reactions represented by the equations 4, 5a and 5b.

Suitable silicates are chain and band silicates such as β-wollastonite ($CaSiO_3$), enstatite ($MgSiO_3$) or diopside ($CaMg(SiO_3)_2$), and also amphiboles such as trennolite $[Ca_2Mg_5(OH)_2Si_4O_{11})_2]$, and sheet silicates such as serpentine $[Mg_3(OH)_4(Si_2O_5)]$ and talc $[Mg_3(OH)_2(Si_2O_5)_2]$. The OH groups of these minerals can be reacted with an alkali metal hydride or alkaline earth metal hydride in accordance with equation (3).

Experiments have also shown that the formation of coreactive groups on the support material can also be achieved using polar organometallic compounds (M-Org, where M is as defined above). However, they can be obtained significantly more simply by the use of the corresponding alkali metal oxides and alkaline earth metal oxides. By way of example, the reaction sequence occurring when $Na_2O$ is used is:

(6a) $H_2O + Na_2O \longrightarrow 2\ NaOH$ (6b), (6c), (6d)

The formation of sodium hydroxide according to reaction equation 6a proceeds more quickly than the reaction of sodium oxide according to reaction equation 6d.

The coreactive groups which have been newly formed on the support materials in the manner described can, regardless of the character of the alkali metal cation or alkaline earth metal cation, be converted into the corresponding hydroxyl groups by means of acids in a manner analogous to equation (4). This enables, for example, the number of Si—OH groups on the surface of the abovementioned silicate materials to be increased. However, the support materials modified in this way are not stable in the long term. Oxygen bridges are gradually formed again with liberation of water according to the following equation:

(7)

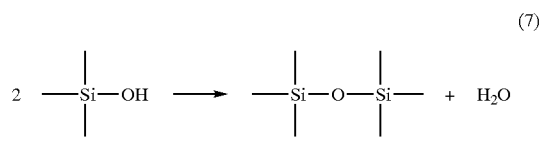

In order to avoid this, the pretreated support materials have to be reacted as quickly as possible with suitable organometallic compounds. This modification is preferably carried out using organometallic compounds or hydridoorganometallic compounds of groups 3A, 3B, 4B, 5B and 6B of the Periodic Table of the Elements. In the following, the metal atoms of these organometallic compounds are denoted by M'. The hydride group reacts more rapidly with the OH groups than does the organic radical.

The organic radicals are preferably organic radicals which promote catalysis/cocatalysis. In particular, they are straight-chain or branched, saturated or unsaturated alkyl radicals having from 1 to 8 carbon atoms and also alkoxy or acyloxy groups derived therefrom, and saturated or unsaturated cyclic, heterocyclic or aromatic radicals. Since halides, hydrides or hydrohalides of the corresponding organometallic compounds can also be used for modifying the surface, hydride groups and/or halogens selected from the group consisting of Cl, F, Br and I may therefore also be bound to the support via M' after the reaction.

In generalized terms, the modification of the pretreated support material, as in the above-described case of the pretreated silica gel, by suitable organometallic compounds of the formula M'(H Org Hal)$_p$ can be represented analogously to the equations 5a to 5d by the equations 5e to 5g and for Si supports by the following reaction equations:

(8a)

or (8b)

When M' is silicon, it is possible to prepare supported catalysts in a known manner by choice of appropriate starting materials without having to split off the organic radical again in order to replace it by the actual reactive group.

(9)
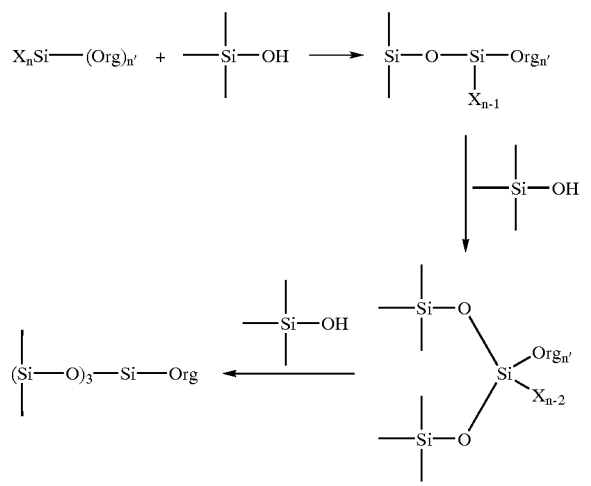

where X is H, Hal, alkoxy, acyloxy.

The supported catalysts of the present invention prepared in this way have a significantly higher number of reactive groups on the surface compared with previously known catalysts of this type. As a result, these catalysts of the invention have considerably higher activities than previously obtainable and commercially available supported catalysts.

According to the invention, it is also possible to treat other support materials in the manner described and to increase their number of coreactive groups. The gels, oxides and salts of boron, aluminium, titanium and zirconium can be treated in a fully analogous manner to the silicate-containing support materials described. Particularly good properties are achieved when appropriate nanosize particles are treated according to the invention, for example nanosize particles of BaTiO$_3$ which are obtainable, inter alia, by means of microemulsion processes (cf. H. Herrig, R. Hempelmann, Materials Letters 27, 287 (1996)). In general, the resulting coreactive support materials or heterogeneous catalysts and heterogeneous cocatalysts having the surface structures modified by organometallic compounds can be described by the formulae (IV) and (V) below:

$$(T-O))m\text{-}M'\text{-}Z_{(p-m)} \qquad (IV)$$

$$(T-O)m\text{-}M'(Nu_r)(Z)_{(p-m-1)} \qquad (V)$$

where

T is an oxidically bound element selected from the group consisting of Si, B, Al, Ti and Zr, M' is an element selected from the group consisting of the elements of groups 3A, 3B, 4B, 5B and 6B of the Periodic Table of the Elements, Z and Nu are as defined above and $\Sigma$m+1 corresponds to the valency p of M', where
1≤m,
m is 1, 2 or 3 and
p is the valency of M'.
M' can, as shown in equations (8b) and (9), form bonds via further oxygen atoms to a plurality of atoms T of the support material.

Supported catalysts and cocatalysts can be prepared in a simple manner from the support materials having an increased number of coreactive groups of the formula (IIIa)

$$T-O-M \qquad (IIIa)$$

where

T is an oxidically bound element selected from the group consisting of Si, B, Al, Ti and Zr, and M is Na, Li, K, Cs, Mg, Ca or Ba, obtained by treatment with hydrides or oxides of the alkali or alkaline earth metals.

These catalysts are suitable for the polymerization of monoolefins such as ethylene, propylene, hexene and styrene. Owing to the novel method of preparation, these catalysts have significantly higher activities than conventional supported polymerization catalysts. The same applies to catalysts for the polymerization of dienes such as butadiene.

In the same way, improved catalysts for

A metathesis reactions, for example with W, Mo or Ru as central atom, also of the ROMP type, B hydrogenation reactions using Rh or Co as central atoms, C coupling reactions, D oxidation reactions and E hydroformylation reactions, if desired with chiral induction, can be prepared by means of the above-described pretreatment of the support materials.

Catalysts, cocatalysts or ligand-bearing heterogeneous supports having the maximum possible or optimally controlled dense loading of the surface are thus obtained advantageously by the process of the invention using organometallic compounds of the formula (VI)

$$(Y)_n\text{-}M'\text{-}(Org)_{n'} \qquad (VIa)$$

$$(Y)_n\text{-}M'\text{-}(Org)_n \qquad (VIb)$$

where Y, M' and Org are as defined above and n=1 to p, n'=0 to p−1. In this way, it is possible to obtain, in accordance with the above reaction equations, novel supported catalysts which can be obtained with a higher number of coreactive OH groups compared with conventional catalysts and therefore have higher activities but at the same time have very high product selectivities.

The formation of a new coreactive intermediate layer having an altered reactivity via the existing OH groups makes it possible to introduce, in a simple manner, functional substituents which increase the opportunities for the synthesis of functional heterogenized materials having the structure IV.

The following examples illustrate the invention, but do not restrict the scope of the invention to these examples alone.

EXAMPLES

Example 1
Generation of Si—ONa Groups (in Accordance With Equations 1–3)

30 g of silica gel spheres (Monospheres—Merck KGaA, Darmstadt) which have a diameter of 500 nm, a density of 2.0, a calculated surface area of 6 m$^2$/g and have been subjected to water treatment and subsequent drying but still contain Si—OH groups and water are admixed with 746 mg of NaH (3.11×10$^{-2}$ mol) in 100 ml of tetrahydrofuran at 30° C. Hydrogen is evolved. The volume of this hydrogen and of the hydrogen liberated by means of trifluorosulphonic acid for monitoring the unreacted NaH indicated a total of 49 OH groups per nm$^2$ (4.9×10$^{-4}$ mol of OH groups per gram of silica gel). This high value can be explained by the fact that water has also reacted in pores or clefts.

On the basis of this preliminary experiment, 30 g of the abovementioned silica spheres in 100 ml of tetrahydrofuran are reacted with the calculated amount of NaH (353 mg=1.47×10$^{-2}$ mol) to give a silica gel having 49 Si—ONa groups per nm$^2$, which will hereinafter be referred to as "SiO$_2$—(ONa)$_{49}$" in the interests of simplicity (analogous nomenclature will also be used for this or other support materials to indicate the type and number of supported groups per nm$^2$). The spheres are filtered off and dried under reduced pressure. The tetrahydrofuran filtrate has a neutral reaction.

In an analogous manner, reactions with LiH, KH, MgH$_2$ and CaH$_2$ form the corresponding alkali metal or alkaline earth metal derivatives. In the case of the alkaline earth metal hydrides, the derivatives SiO$_2$—(OCaH)$_{49}$ and

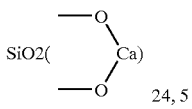

are formed more or less exclusively depending on the choice of the stoichiometrically calculated amount of hydride, as indicated below for CaH$_2$.

In place of the silica gel described, it is also possible to react other supports, e.g. porous silica gel (Merck, catalogue No. 1.07734.9025), Al$_2$O$_3$ (neutral, activity grade 1, Merck catalogue No. 1.01077.2000), TiO$_2$ and zirconium oxide in the presence of various numbers of OH groups and water molecules per nm$^2$.

Example 2
Conversion of the Si—ONa Groups Into Si—OH Groups (Equation 4)
Substitution of the SiOH Groups (Equations 8a–d)

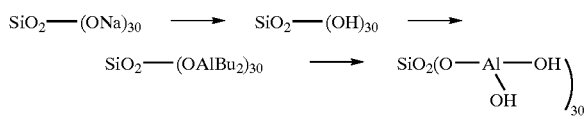

50 g of silica gel spheres (Monospheres 500, Merck KGaA) having a diameter of 500 nm and 30 Si—ONa groups per nm$^2$ (SiO$_2$—ONa$_3$O) are reacted in 100 ml of tetrahydrofuran with 1.39 ml (15.8 mmol) of CF$_3$SO$_3$H to give SiO$_2$—(OH)$_{30}$.

After filtration under nitrogen (Seitz pressure filter) and washing with tetrahydrofuran, the spheres obtained are dispersed in 100 ml of tetrahydrofuran and reacted with 15 mmol of diisobutylaluminium hydride (12.5 ml of a 1.2 molar solution in toluene) to eliminate hydrogen and form SiO$_2$—(OAl(iBu)$_2$)$_{30}$.

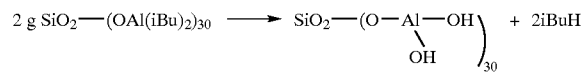

The

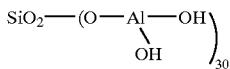

is filtered off and is available for further reactions.

The reaction products can, for example, be reacted with alkali metal hydrides, alkaline earth metal hydrides, organoelement hydrides or alkoxysilanes.

In an analogous manner, acidification of further corresponding Si—(O-alkali metal) or Si—(O-alkaline earth metal) compounds gives the Si—(OH) compounds. These are reacted in an analogous manner with hydrides, organometallic compounds or hydridoorganometallic compounds of Mg, B, Al, Si, Ti, Zr, Zn and the lanthanides. The parallel or successive reaction of various organometallic compounds or metal hydrides selected from among those mentioned above can also be carried out in the manner described. The reaction can also be carried out using oxygen-containing organometallic compounds, e.g. methylaluminoxane (MAO) or alkoxytitanates such as

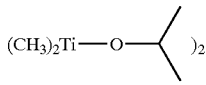

Example 3
Generation of SiOH and Si—ONa Surface Groups by Means of Na$_2$O (Equation 6)

Silica spheres (Monospheres 500, Merck KGaA) having a diameter of 500 nm, 4 Si—OH groups and 2 molecules of water per nm$^2$ are reacted with 6 molecules of Na$_2$O/nm$^2$ (powdered) at 60° C. in tetrahydrofuran for 4 hours while stirring using a method analogous to Example 1. A product containing eight SiONa and eight Si—OH groups per nm$^2$ of surface is formed in accordance with the equations 6. This can be converted as described in Example 1 into a product containing 16 Si—ONa or eight Si—ONa plus eight Si—OH groups or other O-alkali metal or O-alkaline earth metal groups.

The eight Si—ONa groups can be converted into eight Si—OH groups per $nm^2$ by acidification with an acid in accordance with equation 4 (Example 2), so as to give a product having 16 Si—OH groups per $nm^2$.

Example 4
Generation of $$Si-O-M'\begin{matrix}Hal(n-1)\\ Org\ n'\end{matrix}$$

Equations 5a and 5b 5 g of "$SiO_2$—$(ONa)_{49}$" from Example 1 are heated with 0.279 g ($2.09 \times 10^{-3}$ mol) of $AlCl_3$ in 25 ml of heptane for 1.5 hours under reflux under a nitrogen atmosphere, after which 0.102 g ($3.49 \times 10^{-4}$) of zirconocene dichloride ($Cp_2ZrCl_2$) are added and the mixture is refluxed for a further 1 hour. After cooling, the mixture is filtered under nitrogen by means of a Seitz filtration apparatus. The resulting product, whose spherical shape has been retained, corresponds to an "$SiO_2$—$(O-AlCl_2)_{42}$—$(O-Zr-Cp_2Cl)_7$", i.e. it formally contains 42 $OAlCl_2$ and 7 O—$ZrCp_2Cl$ groups per $nm^2$ of surface. In an analogous manner, reaction of 5 g of $SiO_2$—$(ONa)_{49}$ with 0.14 g of $AlCl_3$ and 0.102 g of zirconocene dichloride gives a product which corresponds formally to an $$SiO_2\begin{matrix}-O\\ \\ -O\end{matrix}Al-Cl)\quad (O-Zr-Cp_2Cl)_7$$

In place of $AlCl_3$, it is also possible to react $BCl_3$, $BF_3$, $BF_3$ etherate, $TiCl_4$, $ZrCl_4$, $VCl_5$, $VCl_4$, $CrCl_3$, chlorides of molybdenum and tungsten and appropriate organoelement halides such as $(CH_3)_2$—AlCl, $CH_3AlCl_2$, $Cp_2TiCl_2$, $(CH_3)_2TiCl_2$ and zirconocene derivatives customary in the polymerization of α-olefins.

Example 5
Generation of $$Si-O-M'\begin{matrix}Hn'\\ Org\ n''\end{matrix}$$

From Si—ONa by Means of $$Hal_n-M\begin{matrix}Hn'\\ Org\ n''\end{matrix}$$

Where n+n'+n"=p (Equations 5a and 5b)

5 g of $SiO_2$—$(ONa)_{49}$ are, as described in Example 4, reacted firstly with $AlCl_3$ and then with 90 mg ($3.49 \times 10^{-4}$ mol) of zirconocene hydrochloride). When 279 mg of $AlCl_3$ are used, the result is an "$SiO_2$—$(OAlCl_2)_{42}$—$(O-ZrCp_2H)_7$".

Example 6
Introduction of Organic Ligands

"$SiO_2$—$(OAlBu_2)_{30}$" ⟶

"$SiO_2$—(OAl$\begin{matrix}O\diagdown\diagup N-\\ O\diagup\diagdown N-\end{matrix}$)$_{30}$"

8 g of "$SiO_2$—$(OAlBU_2)_{30}$" are stirred in 30 ml of tetrahydrofuran with 494 mg of 3-N-dimethylaminopropanol for 16 hours at 25° C. The mixture is filtered under nitrogen and the solid is washed with tetrahydrofuran. This gives:

"$SiO_2$—(OAl$\begin{matrix}O\diagdown\diagup N-\\ O\diagup\diagdown N-\end{matrix}$)$_{30}$"

The reaction with bis-1,3-dimethylaminopropan-2-ol or dimethylaminoethanol can be carried out analogously. In place of the amino derivatives of the alcohols, it is also possible to react the corresponding phosphino derivatives in which the phosphorus can be substituted not only by methyl groups but also by cyclohexyl or phenyl groups.

The reaction of the supported —O—$AlBu_2$ groups can be carried out in an analogous manner on aluminium or porous silica gel as support.

Example 7
Introduction of Organic Ligands; Conversion Into a Transition Metal Complex "$SiO_2$—$(O-AlBu_2)_{30}$" ⟶

"$SiO_2$—(OAl$\begin{matrix}N(H)\diagdown\diagup N-\\ N(H)\diagup\diagdown N-\end{matrix}$)$_{30}$" ⟶

"$SiO_2$—O—Al$\begin{matrix}N(H)\diagdown\diagup N\\ N(H)\diagup\diagdown N\end{matrix}$PdCl_2)_{30}$"

10 g of "$SiO_2$—$(O-AlBu_2)_{30}$" are stirred with 612 mg ($6 \times 10^{-3}$ mol) of 3-N-dimethylaminopropyl-1-amine in 30 ml of tetrahydrofuran at 25° C. for 16 hours, as described in Example 6. 3 mmol (532 mg) of $PdCl_2$ are then added directly and the mixture is stirred for another 3 days.

In an analogous manner, 6 g of $SiO_2$—(O—Al$\begin{matrix}O\diagdown\diagup N-\\ O\diagup\diagdown N-\end{matrix}$)

from Example 6 are stirred with 318 mg (1.794 mmol) of $PdCl_2$ in 20 ml of acetonitrile for 3 days to obtain the corresponding Pd(II) complex. Corresponding phosphine complexes of platinum, rhodium and ruthenium and nickel can also be prepared in an analogous way.

Example 8
Ethylene Polymerization 10 ml of 30% methylaluminoxane (MAO) are added to 0.5 g of $$SiO_2(\diagdown Al-Cl)_{21}-(O-Zr-Cp_2Cl)_7$$

(corresponding to 3 mg=$3.3\times10^{-5}$ mol of zirconium) in 50 ml of toluene. The suspension is stirred for about 30 minutes, polymerization is carried out at 25° C. under 5 bar of ethylene for 5 minutes in a Schlenk pressure tube. This gave 9.35 g of polyethylene. No fouling, i.e. conglutination of the polymer, occurred. The polymerization can also be successfully carried out in the presence of other supported catalyst and cocatalyst systems as described in Example 4 and Example 5. The results are reported below for some representatives—yields in brackets.

"$SiO_2$—$(OAlCl_2)_{42}x$—$(OZrCP_2Cl)_7$" (5.68 g), $SiO_2$—$(OAlCl_2)_{42}$—$(OZrCp_2)H)_7$ (0.46 g), $SiO_2(O$—$Al$—$Cl)_{21}$—$(OZrCP_2H)_7$ (1.05 g)

The polymerization can also be successfully carried out in the absence of a MAO if the supported Al cocatalyst is produced by reaction of methylaluminium dichloride or dimethylaluminium chloride on the $SiO_2$—ONa surface.

Example 9
Reaction in Accordance With Equation 9

$$"SiO_2-(OH)_{49}" \longrightarrow (EtO)_3Si\diagup\diagdown PPH_2 \longrightarrow$$

$$SiO_2(-O-Si\diagup-O\diagdown)\diagup\diagdown P\diagup Ph_{16}$$

5 g of "$SiO_2$—$(OH)_{49}$" are stirred in 25 ml of tetrahydrofuran in which 263 mg ($7\times10^{-4}$ mol) of 2-(diphenylphosphino)ethyltriethoxysilane (Dynamit Nobel) have been dissolved for 1 hour at room temperature with addition of 85 mg of trifluoroacetic acid. After filtration and washing with tetrahydrofuran, the product is dried for 12 hours under reduced pressure.

The supported phosphine ligand can, as described in Example 7, be converted into supported, catalytically active metal complexes.

Analogous reaction of 5 g of $SiO_2$—$(OH)_{49}$ in 25 ml of methylene chloride with 300 mg ($7\times10^{-4}$ mol) of $$(EtO)_3Si-(CH_2)_3-O-(CH_2)_2-O-\text{[aryl ketone]}-OH$$

(ZLI-4434, Merck/Novartis)
gives a supported photoinitiator for the polymerization of acrylates.

What is claimed is:

1. A process for preparing a support material having an increased number of reactive groups, comprising
   a) reacting an oxygen-containing inorganic material in an inert aprotic polar or inert aprotic nonpolar solvent with a strongly basic reagent containing one or more alkali metal or alkaline earth metal (M) atoms, the resultant OM groups formed on the surface of the inorganic material optionally being set free by acidifying with an organic or inorganic acid to form OH groups, and
   b) reacting the OH and/or OM groups formed on the surface of the inorganic material with coreactive groups of a ligand, catalyst or cocatalyst, wherein said ligand, catalyst and cocatalyst comprises a functional organic group, and/or
   c) modifying the OH and/or OM groups formed on the surface of the inorganic material by chemisorptively binding coreactive groups, forming a surface comprising chemisorptively bound, functional organic groups.

2. A process according to claim 1, wherein the oxygen-containing inorganic material is a gel, oxide or salt of silicon, boron, aluminum, titanium or zirconium.

3. A process according to claim 1, wherein the oxygen-containing inorganic material is silica gel, an oxygen-containing alkylsiloxane or a naturally occurring silicate derived from silicic acid having a chain, band or sheet structure.

4. A process according to claim 1, wherein the oxygen-containing inorganic material is wollastonite, enstatite, diopside, trennolite, serpentine or talc.

5. A process according to claim 1, wherein the oxygen-containing inorganic material is in the form of particles having a surface area of 1 to 600 $m^2/g$.

6. A process according to claim 1, wherein the oxygen-containing inorganic material is $BaTiO_3$.

7. A process according to claim 1, wherein the inert aprotic solvent is tetrahydrofuran, methyl t-butyl ether, dimethylformamide, N-methylpyrrolidone, tetramethylurea, hexane, heptane, cyclohexane, methylcyclohexane, toluene or xylene.

8. A process according to claim 1, wherein an acid selected from the group consisting of $CH_3SO_3H$, $CF_3SO_3H$, $H_2SO_4$, HF, HCl, HBr, HI and $H_3PO_4$ is used for setting free the resultant OH groups by acidifying.

9. A process according to claim 1, wherein the strongly basic reagent is an alkali metal hydride or alkaline earth metal hydride, an alkali metal oxide or alkaline earth metal oxide, or a polar organometallic compound of an alkali metal or alkaline earth metal.

10. A process according to claim 1, wherein the strongly basic reagent is NaH, LiH, KH, CsH, $MgH_2$, $CaH_2$, $BaH_2$, $Na_2O$, $Li_2O$, $K_2O$, $Cs_2O$, MgO, CaO, BaO, butyllithium, methyllithium, sodium methoxide, potassium t-butoxide, LiOH, NaOH, KOH, CsOH, or Mg $(OH)_2$.

11. A process according to claim 1, further comprising reacting the support material after setting free the resultant OH groups, with a metal halide, a metal hydride or an organometallic compound.

12. A process for preparing a support material having an increased number of reactive groups, comprising reacting an oxygen-containing inorganic material in an inert aprotic polar or inert aprotic nonpolar solvent with a strongly basic reagent containing one or more alkali metal or alkaline earth metal (M) atoms, the resultant OM groups formed on the surface of the inorganic material optionally being set free by acidifying with an organic or inorganic acid to form OH groups, and reacting or modifying the OH and/or OM groups with coreactive groups in a manner that the oxygen-containing inorganic material
   1) has bound thereto a metal which is also bound to an organic group, and/or
   2) has directly bound thereto an organic group.

13. A process for preparing a support material having an increased number of reactive groups, comprising one or more of the following reactions (5a)
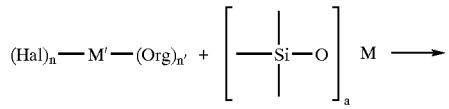→
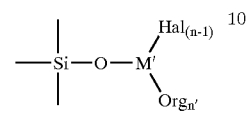

(5b)
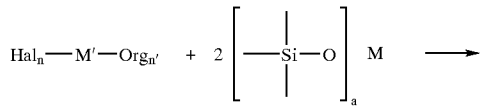→
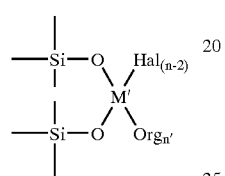

(5c)
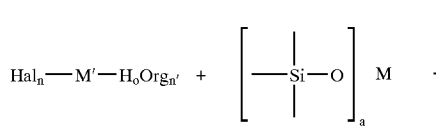→
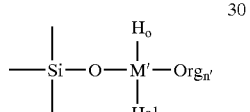

(5d)
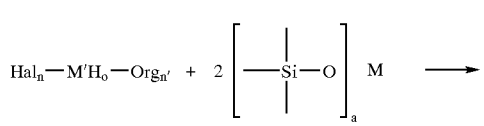→
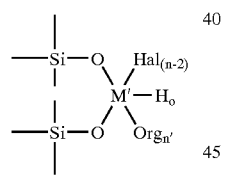

(8a)
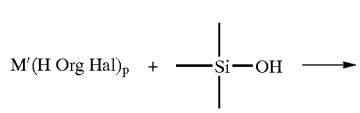→
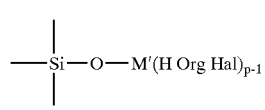

or

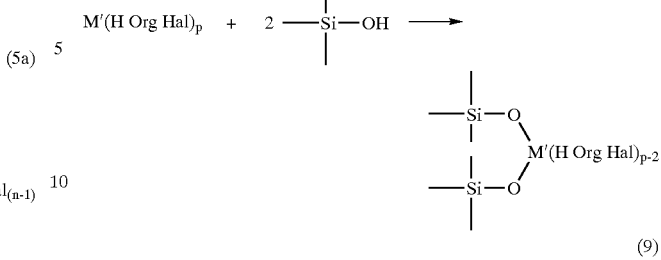

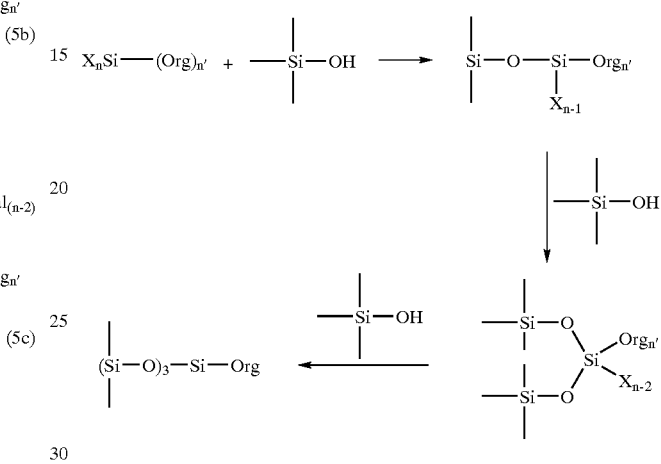

wherein

M is an alkaline earth metal atom,

X is H, Hal, alkoxy or acyloxy,

M' is an element selected from the group consisting of elements of groups 3A, 3B, 4B, 5B and 6B of the Periodic Table of the Elements, Hal is F, Cl, Br, or I, Org is A, OA, ACOO, $NA_2$, SA, $ANA_2$, AOH, AOA, $(AO)_yAr$, $APA_2$, $APAr_2$, a saturated or unsaturated cycloalkyl having up to 6 carbon atoms, or a heterocyclic or aromatic radical Ar, y is 0, 1, 2, 3, 4, A is a straight-chain, branched, saturated or unsaturated alkyl radical having 8 carbon atoms, and Ar is a one or more substituted or unsubstituted phenyl, naphthyl, pyridyl, pyrimidinyl, thienyl, furanyl, where the substituents can be A, OA, COOA, Cl, or F, and wherein the valence of M' corresponds to p=n+n'+o, and n=1 to p, n'=0 to p−1, and o=0 to p−n−n'.

* * * * *